Patented Jan. 8, 1952

2,581,368

UNITED STATES PATENT OFFICE 2,581,368

BLOWN OXYALKYLATED DERIVATIVES OF CERTAIN SOLVENT SOLUBLE PHENOL-ALDEHYDE RESINS

Melvin De Groote, University City, and Bernhard Keiser, Webster Groves, Mo., assignors to Petrolite Corporation, Ltd., Wilmington, Del., a corporation of Delaware No Drawing. Application May 29, 1948,
Serial No. 30,184

7 Claims. (Cl. 260—53)

The present invention is concerned with certain new chemical products, compounds, or compositions which have useful application in various arts. It includes methods or procedures for manufacturing said new chemical products, compounds, or compositions, as well as the products, compounds or compositions themselves. Said new materials or substances are drastically-oxidized, hydrophile, oxyalkylated, phenol-aldehyde resins obtained from oxyalkylation-susceptible, water-insoluble, organic, solvent-soluble, fusible, phenol-aldehyde resins derived from certain difunctional phenols, as hereinafter described. This application is a continuation-in-part of our co-pending application Serial No. 734,209, filed March 12, 1947. Also see our co-pending application Serial No. 8,731, filed February 16, 1948, both now abandoned.

Although the herein described products have a number of industrial applications, they are of particular value for resolving petroleum emulsions of the water-in-oil type, that are commonly referred to as "cut oil," "roily oil," "emulsified oil," etc., and which comprise fine droplets of naturally-occurring water or brines dispersed in a more or less permanent state throughout the oil which constitutes the continuous phase of the emulsion. This specific application is described and claimed in our co-pending application Serial No. 30,183, filed May 28, 1948, Patent 2,498,656, granted February 28, 1950. The new products are also useful as wetting, detergent and leveling agents in the laundry, textile and dyeing industries; as wetting agents and detergents in the acid washing of fruit; in the acid washing of building stone and brick; as wetting agents and spreaders in the application of asphalt in road building or the like; as a constituent of soldering flux preparations; as a flotation reagent in the flotation separation of various aqueous suspensions containing negatively charged particles such as sewage, coal washing waste water, and various trade wastes and the like; as germicides, insecticides, emulsifying agents, as, for example, for cosmetics, spray oils, water-repellent textile finishes; as lubricants; etc.

We have found that if one prepares oxyalkylated derivatives of certain thermoplastic phenol-aldehyde resins and subjects them to drastic oxidation with a gaseous oxygen-containing medium such as air, in the same manner commonly employed to blow or oxidize castor oil, one obtains a product or resultant having enhanced viscosity, markedly decreased water-solubility, and increased hydrophobe property, but otherwise unchanged as a result of oxidation. We have found that some of the products so obtained are markedly more effective than the unoxidized products for certain purposes, particularly demulsification of crude oil, and also as a break inducer in doctor treatment of sour hydrocarbons.

Thus the present invention is concerned with products obtained by the drastic oxidation of certain oxyalkylated derivatives and with the use of such oxidized products for the resolution of petroleum emulsions of the water-in-oil type. The specified demulsifiers are the products obtained by the drastic oxidation by means of a gaseous medium and certain polyhydric derivatives which are obtained in turn by the oxyalkylation of certain resins. These resins are derived by chemical reaction between difunctional monohydric phenols and a reactive aldehyde, such as formaldehyde, nearby homologues, and their equivalent. The phenolic reactant is characterized by one ortho-para nuclear, hydrocarbon substituent having not less than 4 carbon atoms and not more than 8 carbon atoms. Usually, the phenolic reactants are derivatives of hydroxybenzene, i. e., ordinary phenol, and are usually obtained by reaction of phenol with an olefin or an organic chloride in presence of a metallic halide or condensing agent, but similar phenolic reactants obtained from meta-cresol or 3,5-xylenol are equally satisfactory, for the reason that such phenols are still difunctional (reactive) and the presence of the single or even both methyl radicals does not materially affect the sub-surface-activity or the surface-activity or hydrophile balance. The hydrocarbon substituent having 4 to 8 carbon atoms may be alkyl, alkylene, aryl, alicycle, or aralkyl.

The resins, and their manufacture, are described in detail in our Patent 2,498,656, and reference is made to that patent for a full description of the resins and methods of manufacturing, and to Examples 1a through 68a of that patent for specific examples of useful resins.

That patent also describes the oxyalkylation of these resins to produce oxyalkylated resins which are converted by blowing to the products of the present invention and reference is made to that patent and to Examples 1b through 9b and the table in columns 41 through 44 thereof for specific examples of suitable oxyalkylated resins.

Having obtained oxyalkylated derivatives of the kind described in said Patent 2,498,656, and having eliminated any solvent, such as xylene, if present, by distillation with or without the use of vacuum, they are subjected to drastic oxidation in the same manner as is employed in producing blown castor oil, blown soyabean oil, blown neat's-foot oil, etc. It is well known that oxidized oils can be obtained from castor oil, ricinoleic acid, and various derivatives of ricinoleic acid, such as monoricinolein, diricinolein, and polyricinoleic acids. They are produced by the common practice of blowing or oxidizing castor oil and similar fatty oils or acids, particularly nondrying, unsaturated fatty oils, by means of a gaseous medium, such as air, oxygen, ozone, or ozonized air. The gaseous medium, such as air, may be moist or dry and the oxidation may take place in the presence or absence of a catalyst. The catalyst may be of a metallic type, such as lead ricinoleate, cobalt ricinoleate, manganese ricinoleate, etc., or it may be of the organic type which produces peroxide, such as alpha-pinene, linseed oil, etc. Oxidation may take place at atmospheric pressure or super-atmospheric pressure, i. e., pressures up to or including 200 pounds' gauge pressure, and at any temperatures slightly above the boiling point of water, for instance, 120° C. up to any temperature which does not produce undue decomposition by pyrolytic reaction.

The time of blowing may be fairly brief, for example, 80 to 100 hours; or it may be quite extensive, for instance, as long as 10 to 20 days, the longer time periods being employed generally when the temperature is slightly above the boiling point of water, and when oxidation is with air at atmospheric pressure.

One method of preparing drastically-oxidized castor oil is described in U. S. Patent No. 2,023,979, dated December 10, 1935, to Stehr. Also see U. S. Patent No. 2,183,487, dated December 12, 1939, to Colbeth.

In light of what has been said previously, it hardly appears necessary to include any examples of the final drastically-oxidized product. However, as a matter of convenience, the invention may be illustrated by the following examples:

The following examples of drastically-oxidized thermoplastic phenol-aldehyde resins are identified by numbers 1c to 7c.

*Example 1c*

A resin was prepared from butylphenol and formaldehyde in the manner described under the heading of Example 1a in Patent 2,498,656. It was oxyalkylated with ethylene oxide in the manner described under Example 1b in Patent 2,498,656. This resin was subjected to vacuum distillation 50 m. m. Hg (at 190° C.) so as to remove all the xylene. The xylene-free oxyalkylated derivative was subjected to drastic oxidation in conventional equipment of the kind used for oxidizing castor oil. In the laboratory experiment 1,000 grams of an oxyalkylated derivative were held at a temperature of 95° to 110° C. and oxidized with a slow stream of air for approximately 15 to 25 days. The initial products, prior to oxidation, have a pale to medium amber appearance and the final product has a definitely dark amber appearance and is much more viscous than the initial product.

This example clearly illustrates the products obtained by drastic oxidation of the oxyalkylated thermoplastic phenol-aldehyde resins employing a gaseous oxygen-containing medium. The changes that take place are so marked that there is no question as to the nature of the product which has been subjected to oxidation. In the first place, there is an enormous increase in viscosity; in fact, if drastic oxidation is continued, the entire mass becomes stringy, sub-rubbery or rubbery, and insoluble in any one of numerous solvents, such as xylene, diethylether of ethylene glycol, or diethylether of diethylene glycol, or mixtures of aromatic solvents and alcohols, such as butyl alcohol.

However, as soon as there is any marked change in viscosity, there is also a marked change in water solubility, or in the hydrophile property of the compound. In other words, if one starts with an oxyalkylated resin which shows self-emulsifiability prior to drastic oxidation, this property will be greatly reduced, or will almost disappear short of the sub-rubbery stage. If one employs an oxyalkylated resin which shows complete water solubility, then after drastic oxidation, this property will be largely lost or almost completely disappear. Such drastically-oxidized product still has some hydrophile characteristics, due to the obvious presence of oxygen atoms. Thus, the characteristic properties of the oxidized products are (1) reduced hydrophile property, (2) increased viscosity, and (3) indications that further oxidation may readily convert the product to a stringy or sub-rubbery stage. It may be seen that the properties previously noted could be related to ester formation. In other words, one could assume that oxidation converts some of the hydroxyl radicals to carboxyl radicals and these, in turn, esterify with some of the remaining hydroxyl radicals to produce esters. Such cross-linking would, of course, account for properties of the kind previously described, if such esterification did take place. However, chemical examination of the drastically-oxidized product indicates little or no increase in either the acid number, or in the saponification number, at least insufficient to account for the change. Thus, as one would expect, saponification does not regenerate the corresponding parent type of material. It is possible that the change which takes place involves formation of ether linkages between alkylene radicals or residues.

*Example 2c*

The same procedure was followed as in Example 1c, preceding, except that the oxyalkylated resin employed was derived from a mixed amylphenol in the manner described under the heading of Example 5a of Patent 2,498,656. The procedure employed included the elimination of any solvent, if present, prior to oxyalkylation.

*Example 3c*

The procedure employed was identically the same as that described in Example 1c, preceding, except that the oxyalkylated resin employed was derived from octylphenol and formaldehyde in the manner described under the heading of Example 8a of Patent 2,498,656, and subjected to oxyethylation in the manner described under the heading of Example 6b of Patent 2,498,656, and included the removal of any solvent present.

*Example 4c*

The same procedure was followed as in Example 1c, preceding, except that the oxyalkylated resin employed was obtained from cyclohexylphenol and was the particular resin described under the heading of Example 10a of Patent 2,498,656. This was oxyalkylated in the manner described under the heading of Example 8b of Patent 2,498,656, and included the removal of any solvent present.

Example 5c

The same procedure was followed as in Example 1c, preceding, except that the oxyalkylated resin employed was obtained from styrylphenol in the manner described under the heading of Example 11a of Patent 2,498,656 and subjected to oxyalkylation in the manner described under the heading of Example 9b of Patent 2,498,656, and included the removal of any solvent present.

Example 6c

The same procedure was followed as in Example 1c, preceding, except that the oxyalkylated resin was derived from para-tertiary butylphenol and acetaldehyde in the manner described under Example 14a in the examples and in the table of Patent 2,498,656, and included the removal of any solvent present.

Example 7c

The same procedure was followed as in Example 1c, except that the oxyalkylated resin was obtained from para-tertiary butylphenol and benzaldehyde in the manner described under the heading of Example 31a, and in the table of Patent 2,498,656, and included the removal of any solvent present.

In the preceding examples, where reference is made to the tables or text of Patent 2,498,656, the particular examples employed are those showing the ultimate oxyethylated stage, i. e., the final stage having the largest amount of added or combined ethylene oxide.

We have oxidized a number of oxyalkylated resins and the same procedure can be employed in all instances. The oxyalkylated derivatives must have distinct hydrophile properties, as previously described, prior to drastic oxidation. Oxidation is preferably conducted in absence of a solvent, but there may be present an inert solvent, if desired. The drastically-oxidized product must show reduced hydrophile properties, in comparison with the original product and invariably shows a marked increase in viscosity, to say nothing of a darkening in color. Catalysts commonly employed to hasten the oxidation of castor oil or drying oils may be employed to speed up the oxidation reaction, but are not necessary. Oxidation can be speeded up by using somewhat higher temperatures, or by using oxygen under pressure, or air under pressure, rather than atmospheric air. If oxidation goes too far, so as to produce an insoluble or rubbery mass, there is nothing one can do, as a rule, except simply start over with a new batch and stop short of the point where insolubles or rubbery masses are obtained.

Having thus described our invention, what we claim as new and desire to secure by Letters Patent, is:

1. Blown, hydrophile, synthetic products; said hydrophile, synthetic products being oxyalkylation products of (A) an alpha-beta alkylene oxide having not more than 4 carbon atoms and selected from the class consisting of ethylene oxide, propylene oxide, butylene oxide, glycide and methylglycide, and (B) an oxyalkylation-susceptible, fusible, organic solvent-soluble, water-insoluble, phenolaldehyde resin; said resin being derived by reaction between a difunctional monohydric phenol and an aldehyde having not over 8 carbon atoms and having one functional group reactive towards said phenol; said resin being formed in the substantial absence of phenols of functionality greater than 2; said phenol being of the formula:

in which R is a hydrocarbon radical having at least 4 and not more than 8 carbon atoms and substituted in one of the positions ortho and para; said oxyalkylated resin being characterized by the introduction into the resin molecule at the phenolic hydroxyl groups of a plurality of divalent radicals having the formula $(R_1O)_n$ in which $R_1$ is a member selected from the class consisting of ethylene radicals, propylene radicals, butylene radicals, hydroxypropylene radicals, and hydroxybutylene radicals, and $n$ is a numeral varying from 1 to 20; with the proviso that at least 2 moles of alkylene oxide be introduced for each phenolic nucleus; said blowing being conducted by means of a gaseous oxygen-containing medium said blown product having increased viscosity and reduced hydrophile property as compared with the unblown oxyalkylated resin.

2. Blown, hydrophile, synthetic products; said hydrophile, synthetic products being oxyethylation products of (A) ethylene oxide, and (B) an oxyethylation-susceptible, fusible, organic solvent-soluble, water-insoluble phenol-aldehyde resin; said resin being derived by reaction between a difunctional monohydric phenol and an aldehyde having not over 8 carbon atoms and having one functional group reactive towards said phenol; said resin being formed in the substantial absence of phenols of functionality greater than 2; said phenol being of the formula

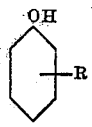

in which R is a hydrocarbon radical having at least 4 and not more than 8 carbon atoms and substituted in one of the positions ortho and para; said oxyethylated resin being characterized by the introduction into the resin molecule at the phenolic hydroxyl groups of a plurality of divalent radicals having the formula $(C_2H_4O)_n$; wherein $n$ is a numeral varying from 1 to 20; with the proviso that at least 2 moles of ethylene oxide be introduced for each phenolic nucleus; and with the final proviso that the hydrophile properties of said oxyethylated resin in an equal weight of xylene are sufficient to produce an emulsion when said xylene solution is shaken vigorously with one to three volumes of water; said blowing being conducted by means of a gaseous oxygen-containing medium said blown product having increased viscosity and reduced hydrophile property as compared with the unblown oxyalkylated resin.

3. Blown, hydrophile, synthetic products; said hydrophile, synthetic products being oxyethylation products of (A) ethylene oxide; and (B) an oxyethylation-susceptible, fusible, organic solvent-soluble, water-insoluble, low-stage phenol-formaldehyde resin having an average molecular weight corresponding to at least 3 and not over 7 phenolic nuclei per resin molecule; said resin being derived by reaction between a difunctional monohydric phenol and formaldehyde; said resin being formed in the substantial absence of phenols of functionality greater than 2; said phenol being of the formula:

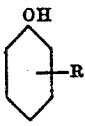

in which A is an aliphatic hydrocarbon radical having at least 4 and not more than 8 carbon atoms and substituted in one of the positions ortho and para; said oxyethylated resin being characterized by the introduction into the resin molecule at the phenolic hydroxyl groups of a plurality of divalent radicals having the formula $(C_2H_4O)_n$; wherein $n$ is a numeral varying from 1 to 20; with the proviso that at least 2 moles of ethylene oxide be introduced for each phenolic nucleus; and with the final proviso that the hydrophile properties of said oxyethylated resin in an equal weight of xylene are sufficient to produce an emulsion when said xylene solution is shaken vigorously with one to three volumes of water; said blowing being conducted by means of a gaseous oxygen-containing medium said blown product having increased viscosity and reduced hydrophile property as compared with the unblown oxyalkylated resin.

4. The products of claim 3, wherein R is substituted in the para position.

5. The products of claim 3, wherein R is a butyl radical substituted in the para position.

6. The products of claim 3, wherein R is an amyl radical substituted in the para position.

7. The products of claim 3, wherein R is an octyl radical substituted in the para position.

MELVIN DE GROOTE.
BERNHARD KEISER.

REFERENCES CITED

The following references are of record in the file of this patent:

UNITED STATES PATENTS

| Number | Name | Date |
|---|---|---|
| 2,178,829 | Bruson et al. | Nov. 7, 1939 |
| 2,454,541 | Bock et al. | Nov. 23, 1948 |